(12) United States Patent
Rinne et al.

(10) Patent No.: US 6,434,363 B2
(45) Date of Patent: *Aug. 13, 2002

(54) INFRARED LINK

(75) Inventors: Juha Rinne; Kaj Saarinen, both of Tampere; Jouko Haavisto, Nokia, all of (FI)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,229

(22) Filed: Dec. 19, 1997

(30) Foreign Application Priority Data

Dec. 30, 1996 (FI) .................................................. 965267

(51) Int. Cl.⁷ .................................................. H04B 7/00
(52) U.S. Cl. ...................... 455/66; 359/157; 359/156; 359/122
(58) Field of Search ................ 379/56.1, 56.3; 359/113, 112, 192, 156, 157, 172, 122; 455/66, 557

(56) References Cited

U.S. PATENT DOCUMENTS

| 3,600,587 A | * | 8/1971 | Smith | 250/199 |
| 3,633,034 A | * | 1/1972 | Uchida | 250/199 |
| 4,618,952 A | * | 10/1986 | Bocher et al. | 375/78 |
| 5,315,645 A | * | 5/1994 | Matheny | 379/144 |
| 5,317,441 A | * | 5/1994 | Sidman | 359/113 |
| 5,500,754 A | * | 3/1996 | Orino et al. | 359/156 |
| 5,636,264 A | | 6/1997 | Sulavuori et al. | 379/56 |
| 5,742,418 A | * | 4/1998 | Mizutani et al. | 359/156 |
| 5,786,921 A | * | 7/1998 | Wang et al. | 359/152 |

FOREIGN PATENT DOCUMENTS

| EP | 0 597442 A1 | * | 5/1994 | H04B/10/24 |
| EP | 0645896 A2 | | 3/1995 | |
| JP | 3-21129 A | * | 11/1979 | H04B/10/24 |
| JP | 354157003 A | * | 11/1979 | H04B/9/00 |
| JP | 5-83197 | * | 4/1993 | H04B/9/00 |

* cited by examiner

Primary Examiner—Edward F. Urban
Assistant Examiner—Meless Zewdu
(74) Attorney, Agent, or Firm—Perman & Green, LLP

(57) ABSTRACT

It is possible to create a two channel data transfer system using an infrared link according to the invention. It is possible by utilizing it to transfer data between two terminal devices (10, 20, 50, 60) simultaneously to both directions (full duplex), or to establish a two-channel data transfer connection between two terminal devices (30, 40, 70, 80). An infrared link according to the invention is realized using linearly polarized infrared light (LV, LH). In it a data transfer channel formed using an infrared connection is divided into two separate channels using e.g. polarizers (V1, V2, H1, H2) or beam splitters (BS1, BS2). In this case, when data is transferred between two terminal devices (10, 20, 30, 40, 50, 60, 70, 80), the data transfer to one direction is realized e.g. using vertically polarized infrared light (LV), and correspondingly to the other direction using horizontally polarized infrared light (LH).

16 Claims, 7 Drawing Sheets

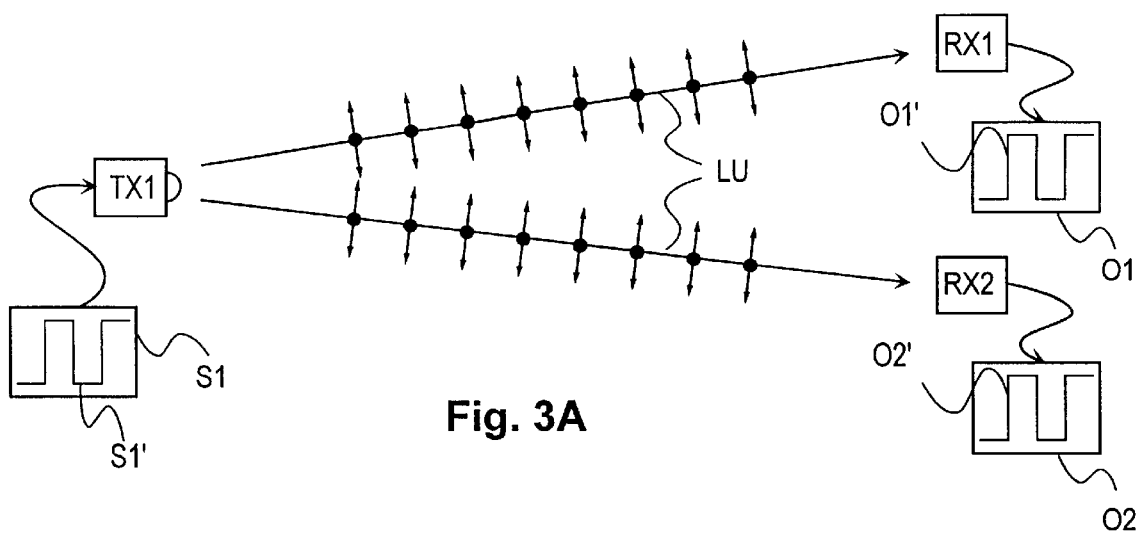
Fig. 3A
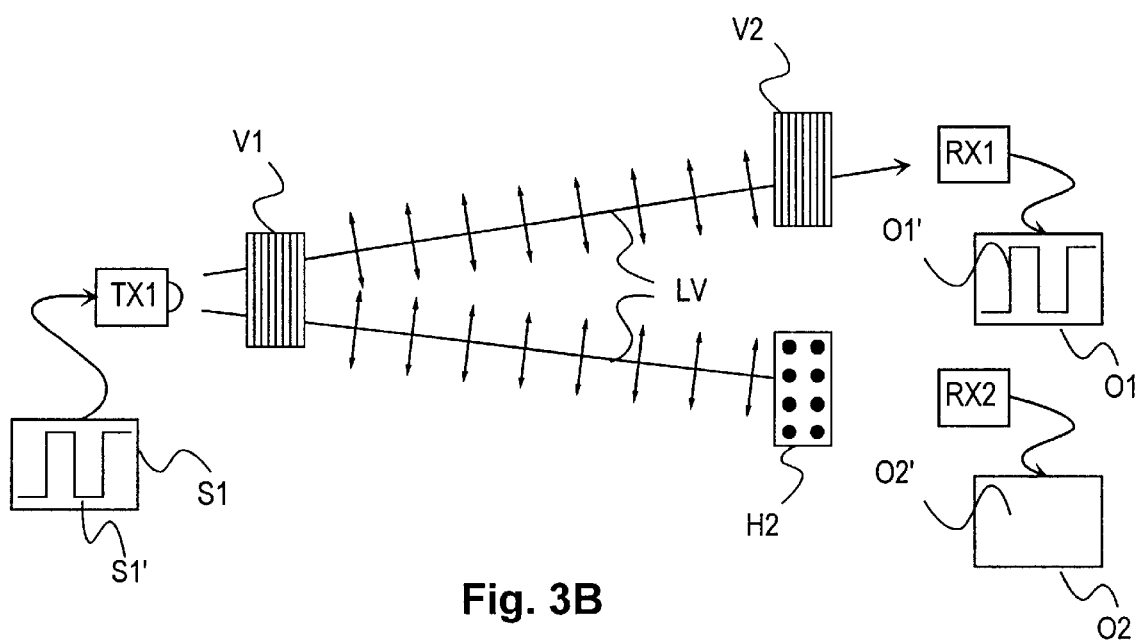
Fig. 3B
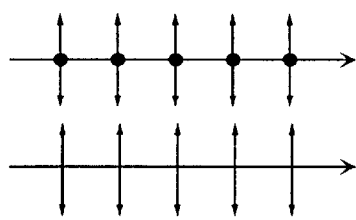 UNPOLARIZED (INFRA)RED LIGHT
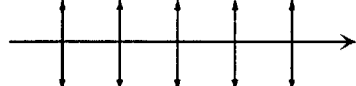 VERTICALLY POLARIZED (INFRA)RED LIGHT
 HORIZONTALLY POLARIZED (INFRA)RED LIGHT

INFRARED LINK

FIELD OF THE INVENTION

The present invention relates to a method of transferring information between two terminal devices using infrared wavelength range. The invention is in particular related to two-way data transfer using the same infrared wavelength range, and terminal devices between which the data transfer is carried out.

BACKGROUND OF THE INVENTION

In the modern information society numerous portable terminal devices are used, such as advanced computers, mobile stations and pocket computers. It is very often necessary to transfer information from these terminal devices to some other device, such as a normal computer, and correspondingly to receive data from this other device. This data transfer is typically realized either using a cable specially manufactured for this purpose, but nowadays more and more extensively using an infrared connection. An infrared connection is a fast, and on short distances reliable, way to transfer data.

Previously an infrared connection between two devices was realized using different manufacturers' own standards (proprietary standards). This naturally reduced the compatibility of terminal devices of different brands and infrared connections becoming more common. In applications in which compatibility was not required, such as remote control of domestic appliances, using infrared connections quickly became common. It would be to the advantage of different manufacturers, but above all to the advantage of end users, if there were one general standard for data transfer realized using infrared connection. One of the solutions aiming at this target is the the IrDA (Infrared Data Association) -standard.

The IrDA -standard, known to a person skilled in the art, is a data transfer protocol for one-way serial data. Utilizing it, it is possible to transfer data between two terminal devices alternately using infrared wavelength range from 850 to 900 nm. In many cases a simultaneous, two-way (full duplex) data transfer would be a great advantage. The IrDa -standard does not offer this possibility; nor does any other prior art data transfer system operating in the infrared wavelength range.

SUMMARY OF THE INVENTION

Now an infrared link has been invented, in which it is possible to transfer data between two terminal devices simultaneously in both directions (full duplex). An infrared link according to the invention is preferably realized using linearly polarized infrared light, but it is also possible to use other wavelength ranges. A data transfer channel to be formed using an infrared connection is divided into two separate channels using polarization. The polarization of light is achieved using e.g. polarizers, beam-splitters or birefracting crystals. In this way, when data is transferred between two terminal devices, data transfer in one direction is realized e.g. using vertically polarized infrared light, and correspondingly in the other direction using horizontally polarized infrared light. The data transfer is preferably realized using a direct light beam, but it is also possible to realize it using an optical fiber cable with suitable optical properties.

An infrared link according to the invention facilitates interrupting of the otherwise uninterrupted data transfer connection at the request of the receiving terminal device. In such a case the receiving terminal device can e.g. inform of the filling up of the buffer memory of the receiver in order to interrupt the data transmission. Correspondingly, data transfer errors can easily and quickly be corrected straight after they are detected, because the receiving terminal device can request a re-transmission immediately after having detected the errors. In addition to the above, two-way data transfer preferably makes data transfer faster on such occasions in which data is exchanged between two terminal devices. The bigger the volume of the data transfer required, the bigger the benefit achieved with the invention.

In an infrared link according to the invention a data transfer channel operating at infrared wavelength range is divided into two parts utilizing polarization. In one embodiment of the invention it is possible to use the created two data transfer channels for data transfer to a certain two terminal device. In this way, when data is transferred from transmitter A to receiver B or C, transmitter A can select the receiving terminal device B or C using the polarization of the infrared light it emits. This is realized e.g. by providing receiver B with a horizontal polarizer and receiver C with a vertical polarizer, and transmitter A with transmitting means which are capable of transmitting both horizontally and vertically polarized infrared light as chosen.

In another embodiment of the invention dividing an infrared data transfer channel operating at infrared wavelength range into two channels, achieved by polarization, preferably facilitates also the doubling of the data transfer capacity of the data transfer channel. This has been realized in such a way that a transmitter is provided with two separate transmitter units, of which one transmits data using horizontally polarized infrared light and the other using vertically polarized infrared light. In a receiver the informations are separated from each other using horizontal and vertical polarizers or a beam splitter. In this way it is possible, using an IrDA-connection capable of 4 Mbps data transfer rate, to transfer data at a total data transfer rate of 8 Mbps. Because the data transfer channels separated from each other using polarization are independent of each other, the system according to the invention also facilitates the realization of two 4 Mbps data transfer channels simultaneously.

The features characteristic of the infrared link according to the invention are presented in the characterizing parts of the claims.

BRIEF DESCRIPTION OF THE DRAWINGS

The invention is described in detail in the following with reference to enclosed figures, of which FIGS. 3A, 3B and 3C present the propagation of infrared light from a transmitter to two separate receivers using different polarizer combinations.

DETAILED DESCRIPTION

Figure 1:
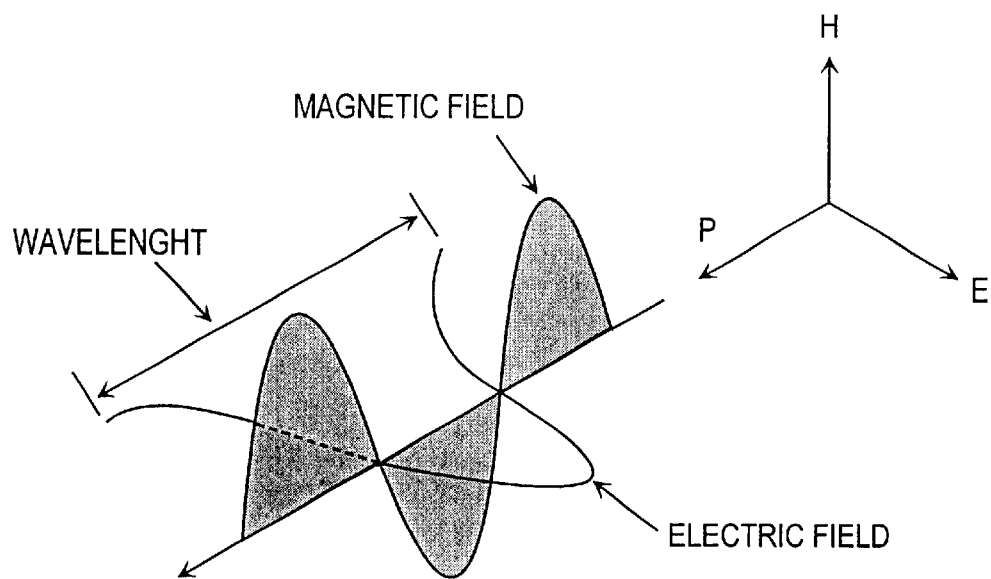
FIG. 1 presents the propagation of electromagnetic radiation, such as infrared radiation, and the directions of the vectors of an electric field and of a magnetic field in relation to the direction of propagation of the radiation.

Light travels in the form of transverse electromagnetic waves. The electric field and the magnetic field vectors are perpendicular to the direction of propagation and to each other as shown in FIG. 1. Defining the direction of propagation P of a ray and the direction of the electric field vector E defines actually a three-dimensional vector space, the vectors of which are: the direction of beam propagation P, electric field E and magnetic field H. Most incoherent light sources consist of large number of emitting atoms or molecules. The vectors of the electric fields of the rays emitted from these light sources have random directions—such light rays are called unpolarized.

The direction of the electric field describes the polarization. If the light consists of rays, the electric fields of which are oriented in the same direction, the light is said to be linearly polarized. If the vector of the electric field is horizontal, it is said that the light beam is horizontally polarized and correspondingly, if the vector of the electric field is vertical, vertically polarized.

When a linearly polarized light beam is directed at a polarizer, the amount of the light passing through depends on the angle between the polarization axis of the light beam and the polarization axis of the polarizer. When the axes are parallel, the light passing through reaches its maximum intensity. In such a case the ratio between the light passed through and the light reaching the polarizer is called major principal transmittance $k_1$. When the polarizer in turned into a position in which the intensity of the linearly polarized light transmitted through the polarizer is at minimum, correspondingly minor principal transmittance $k_2$ is obtained. The ratio between major and minor transmittance $k_2/k_1$ is called the extinction ratio. Extinction ratio $k_2/k_1$ depends on the construction of the polarizer and the wavelength used. The extinction ratio is typically $10^{-3}$ for sheet polarizers, $10^{-4}$ for thin film polarizers and $<10^{-5}$ for crystal polarizers. When a polarizer is rotated in relation to the polarization axis of a linearly polarized light beam, transmittance k is a function of the following equation:

$$k=(k_1-k_2)\cos^2\theta+k_2, \qquad (1)$$

in which θ is the angle between the electric field vector and the polarization axis.

When an unpolarized light beam is directed through two similar polarizers, the polarization axes of which are perpendicular to each other, the intensity of transmitted light is obtained.

$$\frac{2k_1 k_2}{k_1^2+k_2^2} \approx 2\frac{k_2}{k_1}, \qquad (2)$$

presuming that $k_1 >> k_2$

Figure 2A:
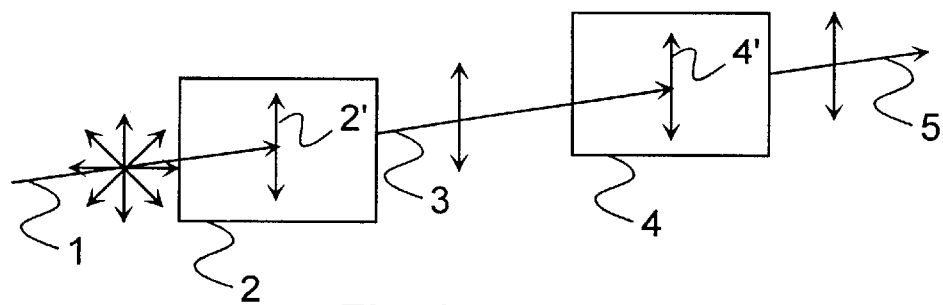
FIGS. 2A and 2B present the propagation of unpolarized infrared light through two polarizers at different angles between polarization axes.
Figure 2B:
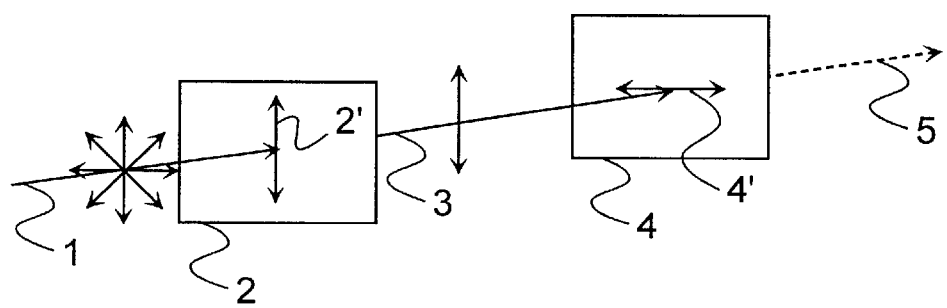

When unpolarized light beam 1 (FIG. 2A) passes through polarizer 2, light 3 becomes linearly polarized. When this linearly polarized light 3 is directed through another polarizer 4, the intensity of the transmitted light 5 depends on the angle between polarization axes 2', 4' of polarizers 2, 4. When the angle is 0° (parallel) the intensity of transmitted light 5 is at highest, and correspondingly when the angle θ is 90° (FIG. 2B) the intensity of transmitted light 5 is at lowest. At other angles θ, the intensity of transmitted light 5 is obtained using equation $$I \approx I_{max} \cos^2\theta \qquad (3)$$

in which
I=the intensity of transmitted light at angle θ,
$I_{max}$=the maximum intensity of transmitted light
θ=the angle between the polarization axes of the polarizers.

Figure 7:
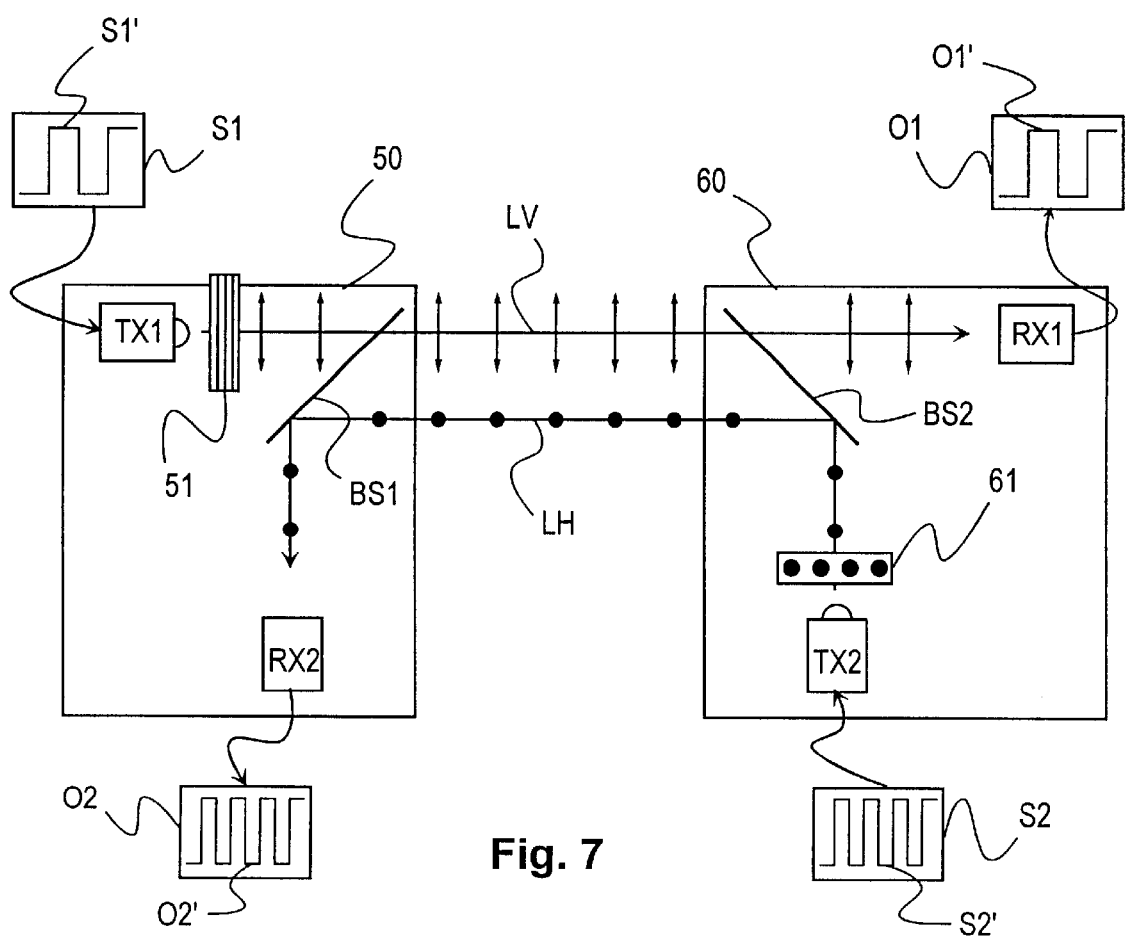
FIG. 7 presents a system according to the invention utilizing an infrared link realized using beam splitters, in which system data is transferred in both directions between two terminal devices.
Figure 8:
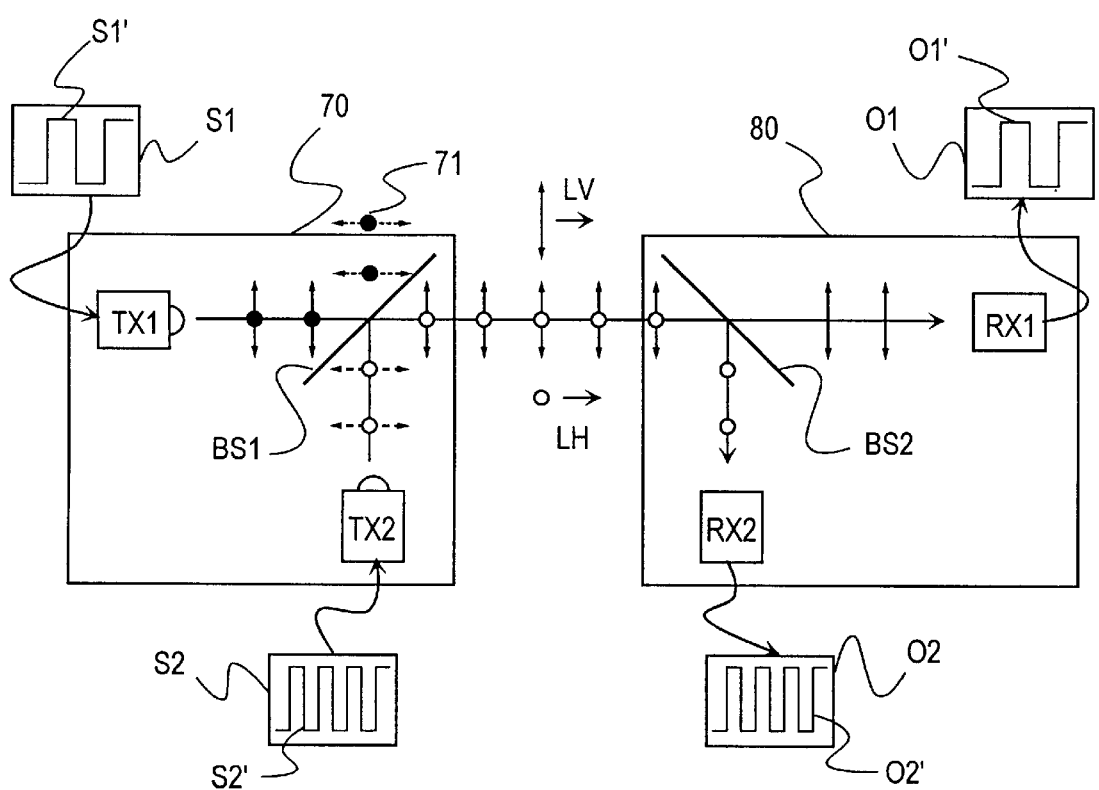
FIG. 8 presents a system according to the invention utilizing an infrared link realized using beam splitters, in which system data is transferred from one terminal device to another using two separate data transfer channels.

FIGS. 3A-3C, 4 and 5 present the test arrangement, with which tests were conducted on the operation modes of one embodiment of an infrared link according to the invention, and FIGS. 7 and 8 present another embodiment of the invention. In the tests it was used as infrared transmitter elements TX1 and TX2 (TX1 and TX2 for shortness) and as infrared receiver elements RX1 and RX2 (RX1 and RX2 for shortness) commercially available combined infrared transceiver elements, type HSDL-1000 combined Infrared Transceiver manufactured by Hewlett Packard. Equally well, separate transmitter- and receiver elements could have been used. Adjustable signals S1' and S2' were fed to transmitter elements TX1 and TX2 using signal generators S1 and S2. Signals O1' and O2' received by receiver elements RX1 and RX2 were analyzed using oscilloscopes O1 and O2. As polarizers V1, V2, H1 and H2, sheet polarizers were used, type HR PLASTIC PID 605211. They are made of oriented molecular structure long chain polyvinyl alcohol, which cause high absorbing and polarization. The functional principle of a sheet polarizer is to absorb unwanted light rays in its structures. The maximum intensity of the transmitted infrared light used in the test arrangement was at wavelength 875 nm and the maximum sensitivity of the received signal was at 880 nm.

In the test arrangements and in their description vertically and horizontally polarized infrared lights are used. This is done because there are established notations for unpolarized, vertically- and horizontally polarized infrared light, and the concepts are unambiguous. Equally well it is possible to use, instead of vertically- and horizontally polarized infrared light beams, infrared light beams that have another polarization angle. It is essential that the angle between the angle of polarization axes of the polarized infrared light beams is approximately 90°. The more the angle between the polarization axes differs from 90°, the more unstable the operation of the system becomes.

FIG. 3A presents how unpolarized infrared light LU propagates in free space from transmitter element TX1 equally to receiver element RX1 as well as to receiver element RX2. In the arrangement in FIG. 3A infrared light signal LU is detected equally in receiver elements RX1 and RX2 provided that the distances and angles of incidence between transmitter element TX1 and receiver elements RX1 and RX2 are essentially equal. Infrared light behaves (as does visible light) in such a way that the intensity of infrared light LU received by and receiver elements RX1 and RX2 becomes lower, the longer the distance between transmitter element TX1 and receiver elements RX1 and RX2 becomes. Also the directing of light by transmitter element TX1 has an essential importance, because transmitter element TX1 emits infrared light at different efficiency in different directions. When signal S1' is supplied from signal generator S1 to transmitter element TX1 for transmission, received signals O1' and O2' corresponding to transmitted signal S1' are presented in the displays of oscilloscopes O1 and O2 when transmitter element TX1 and receiver elements RX1 and RX2 are suitably directed.

FIG. 3B presents what happens when vertical polarizer V1 is placed in front of transmitter element TX1, vertical polarizer V2 in front of receiver element RX1 and horizontal polarizer H2 in front of receiver element RX2. The infrared light emitted by transmitter element TX1 is polarized in vertical polarizer V1 into vertically polarized infrared light LV. When it meets vertical polarizer V2, the polarization axis of which accordingly is essentially parallel to that of vertical polarizer V1, vertically polarized infrared light LV passes through vertical polarizer V2. In this case the transmitted infrared beam can be detected using receiver element RX1. Transmitted signal S1' is detected on the display of oscilloscope O1 as signal O1', whereas, vertically polarized infrared light LV does not pass through horizontal polarizer H2, but is absorbed in horizontal polarizer H2. Accordingly, signal O2' is not detected with oscilloscope O2'.

Figure 3C:
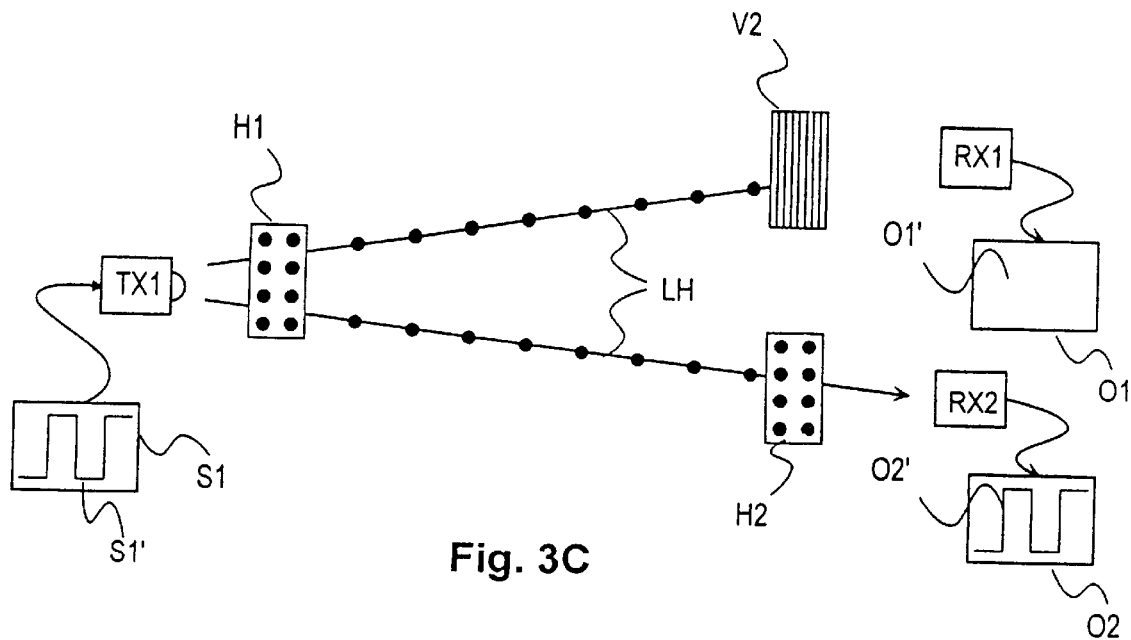

FIG. 3C presents a corresponding test arrangement changed in such a way, that vertical polarizer V2 has been replaced with horizontal polarizer H1. In this case the infrared light emitted by transmitter element TX1 is polarized into horizontally polarized infrared light LH. It does not pass through vertical polarizer V2, and accordingly signal O1' is not detected with oscilloscope O1, but horizontally polarized infrared light LH passes through horizontal polarizer H2 instead. Signal O2' corresponding to transmitted signal S1' can be detected using oscilloscope O2. Based upon the test arrangement shown in FIGS. 3B and 3C it is observed that, depending on polarizers V1 and H1 exchanged in front of transmitter element TX1, the receiver to which signal S1' is transferred can be selected. This facilitates the utilization of the invention e.g. in remote controllers in such a way that when the remote controller is set in a horizontal position it controls a device different from the device it would control if it were in vertical position. Alternatively, the polarizer placed in front of the transmitter can be of rotating type, in which case the direction of the polarizing axis is freely selectable.

Figure 3D:
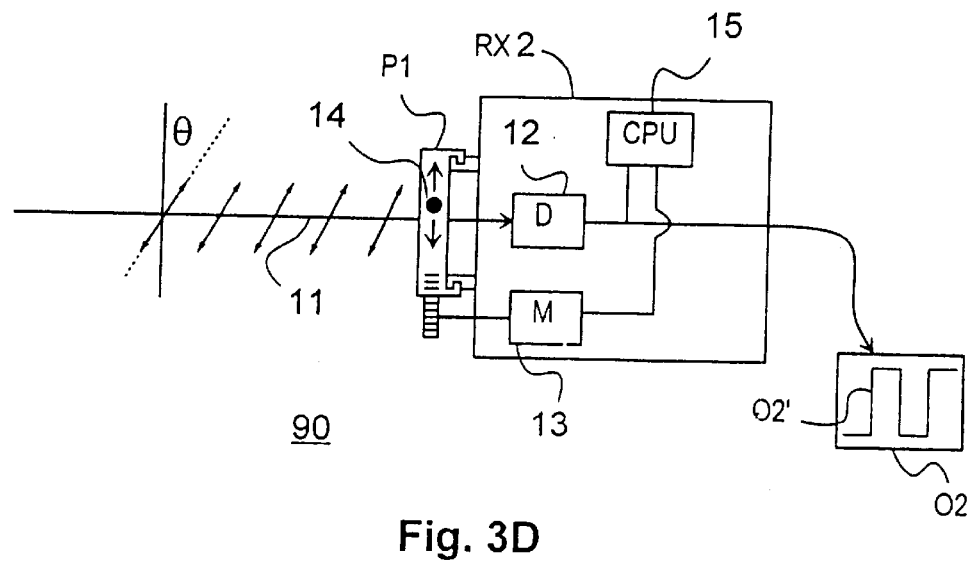
FIG. 3D presents a receiver provided with an adjustable polarizer.

If the polarization axis of horizontal polarizer H1 (FIG. 3C) in front of transmitter element TX1 is not perfectly horizontal, or if the whole transmitter element TX1 is oblique, it inflicts an angle error in the polarization axis of horizontally polarized infrared light LH. In this case the extinction of horizontally polarized infrared light LH is higher than in an ideal situation when it passes through horizontal polarizer H2. FIG. 3D presents a solution to correct this situation, in which solution horizontal polarizer H2 (FIG. 3C) in front of receiver element RX2 has been replaced with adjustable polarizer P1. It is possible to realize adjustable polarizer P1 e.g. by mounting a linear polarizer on receiver element RX2 in such a way that it can be rotated. This type of construction is known to a person skilled in the art e.g. from lens and filter systems used in photography. When polarized infrared light 11 having a certain polarization angle θ arrives at adjustable polarizer P1, part of polarized infrared light 11 passes through it. This part can be detected using detector 12, and further as signal O2' on the display of oscilloscope O2. By rotating adjustable polarizer P1 using knob 14, it is possible by observing signal O2' to rotate adjustable polarizer P1 into such a position in which the intensity of signal O2' is at maximum. Now the angle of polarization axis of polarizer P1 matches exactly polarization angle θ of infrared light 11, and the data transfer is less sensitive to external interference.

It is possible to realize the adjustment described in the previous section also automatically by providing receiver element RX2 with processor 15 and rotator motor 13. Processor 15 measures the level of the signal it receives from detector 12 e.g. using a level detector (not shown in the figure), and based upon the data received from said detector, processor 15 controls motor 13 to rotate adjustable polarizer P1 into the optimal position. When the optimal position has been verified, it is possible to set receiver RX2 to monitor also another data transfer channel which has been realized using a 90° shifted polarization axis. This is realized by rotating polarizer P1 by 90°. A return to the original data transfer connection is made by rotating polarizer P1 another 90°.

Figure 4:
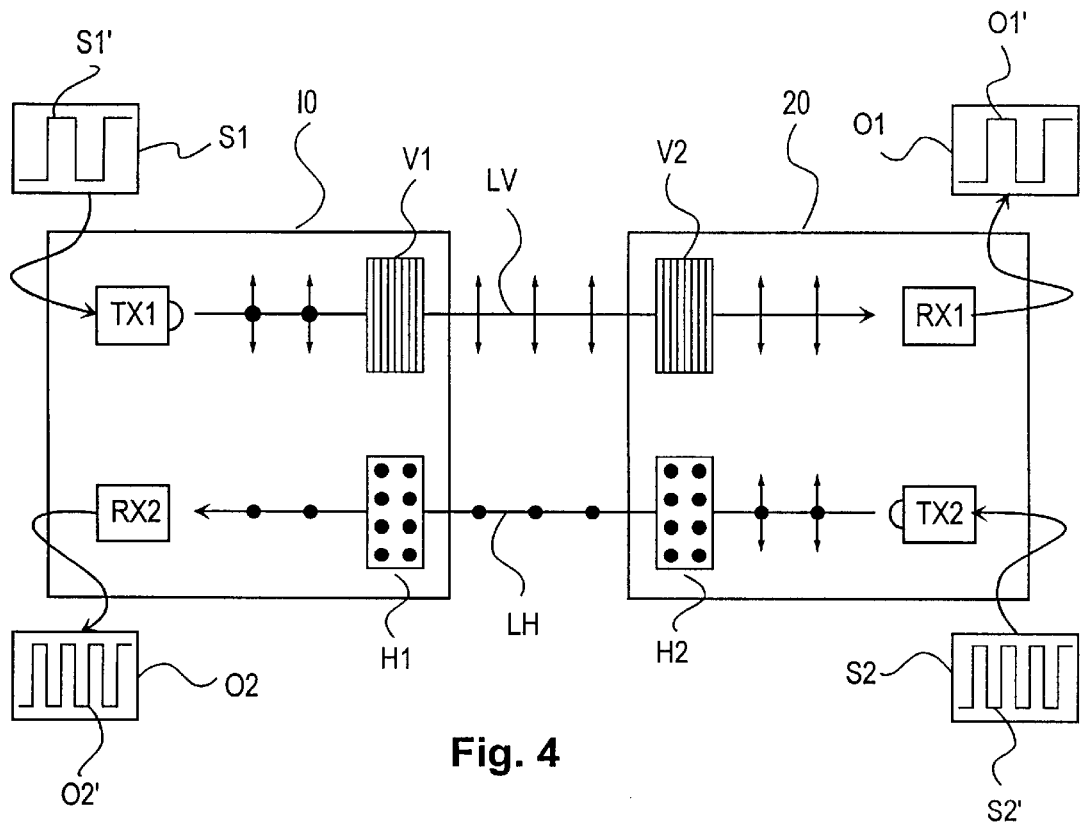
FIG. 4 presents a system according to the invention utilizing an infrared link realized using polarizers, in which system data is transferred in both directions between two terminal devices.

FIG. 4 presents an embodiment of an infrared link according to the invention, in which simultaneous two-way (full-duplex) data transfer between two terminal devices 10 and 20 has been realized using infrared connection. First terminal device 10 comprises transmitter element TX1, receiver element RX2, vertical polarizer V1 and horizontal polarizer H1. Second terminal device 20 has a similar construction, comprising transmitter element TX2, receiver element RX1, vertical polarizer V1 and horizontal polarizer H2. When sparse square wave S1' is fed from signal generator S1 to transmitter element TX1 of terminal device 10, the generated infrared light beam passes through polarizers V1 and V2 to receiver element RX1, from which it can be detected using oscilloscope O1. Horizontal polarizer H1 prevents vertically polarized infrared light beam LV from entering receiver element RX2 of terminal device 10, and in this way infrared light beam LV does not interfere in its operation. Simultaneously transmitter element TX2 of terminal device 20 transmits dense square wave S2' generated by signal generator S2 through horizontal polarizers H2 and H1 to receiver element RX2, from which dense square wave S2' can be detected using oscilloscope O2. Vertical polarizer V2 prevents horizontally polarized infrared light beam LH from entering receiver element RX1 of terminal device 20 and interfering in its operation. In this way, two-way data transfer between terminal devices 10 and 20 is possible using an infrared link according to the invention utilizing a method based upon polarization.

As to their structure, polarizers V1, V2, H1 and H2 used in the test arrangements have been realized using two polarizing sheets placed on top of each other, yielding a higher polarization grade. The major principal transmittance of polarizers V1, V2, H1 and H2 $k_1=27.2$ and the minor principal transmittance $k_2=0.681$ when operating at wavelength 880 nm. This results in an extinction ratio $k_2/k_1= 25.0 \cdot 10^{-3}$. The ratio of the intensities when the polarization axes are perpendicular to each other is obtained according to equation (2), $$2\frac{k_2}{k_1} = 0,05.$$

This means that when the polarization axes of the polarizers are perpendicular to each other, 5% of the light passes through the polarizers compared with the situation when the polarization axes are parallel. The longest operating distance of the test system was found to be over one meter. The extinction ratio of the polarizing sheets used in the tests $k_2/k_1=25.0 \cdot 10^{-3}$ is not the best possible. It is obvious that by choosing polarizers with a lower extinction ratio (for example thin film or crystal polarizers) and by using more powerful infrared transmitter elements, it is possible to increase the operating distance of the system significantly.

Figure 5:
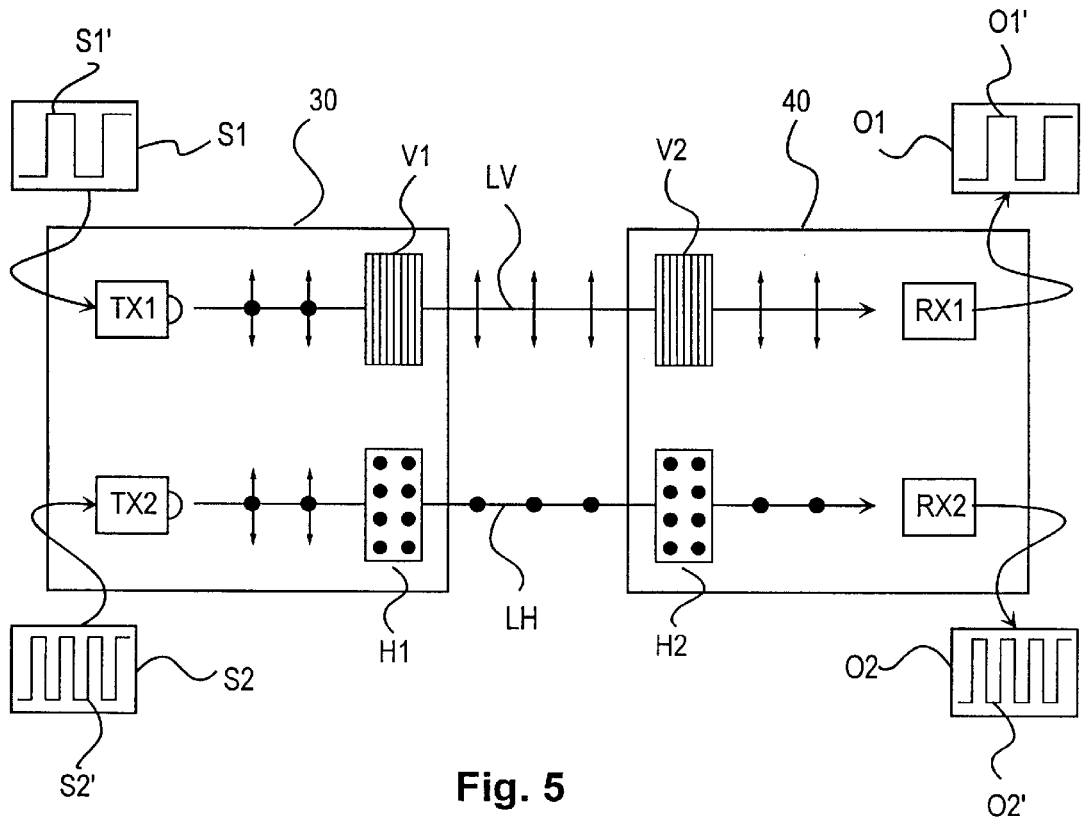
FIG. 5 presents a system according to the invention utilizing an infrared link realized using polarizers, in which system data is transferred from one terminal device to another using two separate data transfer channels.

FIG. 5 presents another embodiment of an infrared link according to the invention, in which transferring two independent signals S1' and S2' from terminal device 30 to terminal device 40 has been realized. As components of the system the same components were used as in the embodiment of the two-way infrared link presented in connection with FIG. 4. The propagation of sparse square wave signal S1' from transmitter element TX1 to receiver element RX1 is identical to the propagation presented in FIG. 4. Signal S2', instead, is transferred to the opposite direction. Terminal device 30 comprises, in addition to transmitter element TX1, second transmitter element TX2, to which dense square wave signal S2' is fed from signal generator S2. The infrared light signal transmitted by transmitter element TX2 is horizontally polarized in horizontal polarizer H1. Horizontally polarized infrared light LH propagates through horizontal polarizer H2 to receiver element RX2, from which the signal can be detected using oscilloscope O2. Consequently, linearly polarized infrared light beams LV and LH transmitted by terminal device 30 can be separated from each other in the infrared link according to the invention in terminal device 40 using polarizers V2 and H2. It is because of this that it is possible to transfer two separate data signals S1' and S2' from terminal device 30 to terminal device 40, or alternatively to double the data transfer rate available for a conventional infrared connection.

In the embodiments presented in FIGS. 4 and 5 infrared light beams LV and LH, having polarization axes perpendicular to each other, were formed and separated from each other using polarizers V1, V2, H1 and H2. It is possible to use beam splitters instead of polarizers V1, V2, H1 and H2. The basic purpose of a beam splitter is to divide a (infrared) light beam into two parts, both parts having equal amplitudes. In practice this means amplitude ratios from approximately 30/70 to 50/50, depending on the material the beam splitter is made of. One beam splitter suitable for infrared frequency range is a thin film made of polytetrafluoroethylene (Mylar).

Figure 6:
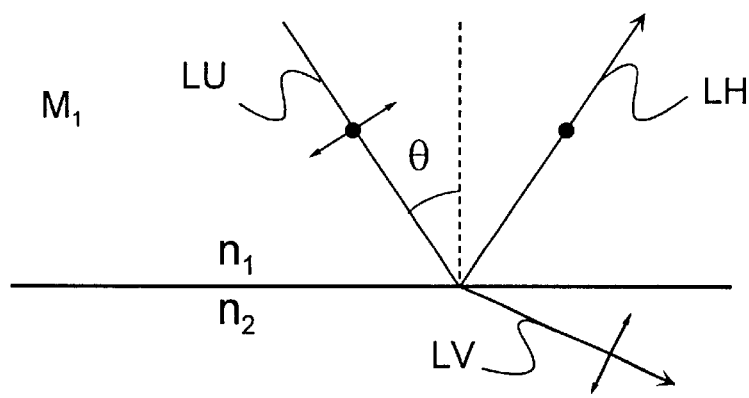
FIG. 6 presents refraction and reflection of infrared light when it meets the boundary surface of two different media.

When light beam LU (FIG. 6) meets the boundary surface of two media $M_1$ and $M_2$, part of the light is reflected and the other part passes through the boundary surface and is refracted. The division of these two parts depends both on the angle θ between the arriving light beam and the normal of the boundary surface of the two media $M_1$ and $M_2$ and on refractive indices $n_1$ and $n_2$ of the two media $M_1$ and $M_2$. In FIG. 6 light beam LU, consisting of two linearly polarized and perpendicular to each other, plane waves, meets the boundary surface of two media $M_1$ and $M_2$. At a certain angle, Brewster's angle, the polarization is nearly complete. One plane wave LH is reflected and the other plane wave LV passes through the boundary surface. Brewster's angle is obtained from equation:

$$\theta = \arctan\left(\frac{n_2}{n_1}\right) \quad (4)$$

If medium $M_1$ is air, equation (4) is simplified (approximately) into form:

$$\theta \approx \arctan(n_2)$$

Variations in the vicinity of Brewster's angle are slow, thus the above described phenomena can be detected in a narrow range around Brewster's angle.

FIG. 7 presents an embodiment of an infrared link according to the invention, in which also two-way, simultaneous (full-duplex) data transfer has been realized. As a whole system, the operating principle is similar to that of the system presented in FIG. 4, but in the system in FIG. 7 beam splitters BS1 and BS2 are used instead of polarizers V1, V2, H1 and H2 for polarizing the infrared light and for separating the polarized infrared beams. Signal S1' is transferred from transmitter element TX1 as an infrared signal to beam splitter BS1, in which the vertically polarized part LV of the infrared light passes through beam splitter BS1. If desired, it is possible to install additional vertical polarizer 51 between transmitter element TX1 and beam splitter BS1. However, it is not necessary, because due to the operating principle of beam splitter BS1 any horizontally polarized infrared light is reflected and is absorbed in the structures of device 50. Vertically polarized infrared light LV passes through beam splitter BS2, after which signal O1' corresponding to signal S1' can be detected in the display of oscilloscope O1. In the opposite direction, information (signal S2') is transferred using transmitter element TX2. After optional horizontal polarizer 61 the infrared beam meets beam splitter BS2, in which horizontally polarized infrared light beam LH is reflected. Any eventual vertically polarized infrared light passes through beam splitter BS2 and is absorbed in the structures of device 60. Reflected infrared light beam LH then meets beam splitter BS1, from which it is reflected to receiver element RX2 for detection. In this way the two-way infrared link according to the invention can also be realized using beam splitters BS1 and BS2.

FIG. 8 presents an embodiment of the infrared link according to the invention, in which also two-way data transfer, similar to that of FIG. 5, from terminal device 70 to terminal device 80 has been realized. As in the solution presented in FIG. 7, polarizers V1, V2, H1 and H2 have been replaced with beam splitters BS1 and BS2. Terminal device 70 is equipped with two transmitter elements TX1 and TX2, through which infrared signals are directed at a beam splitter. The vertically polarized part of the infrared light beam emitted by transmitter element TX1 passes through beam splitters BS1 and BS2, while the horizontally polarized part of the infrared light beam emitted by transmitter element TX2 is reflected from both beam splitter BS1 and BS2 as presented in FIG. 8. Any other infrared light beams are absorbed in structures (ref. 71).

Figure 9:
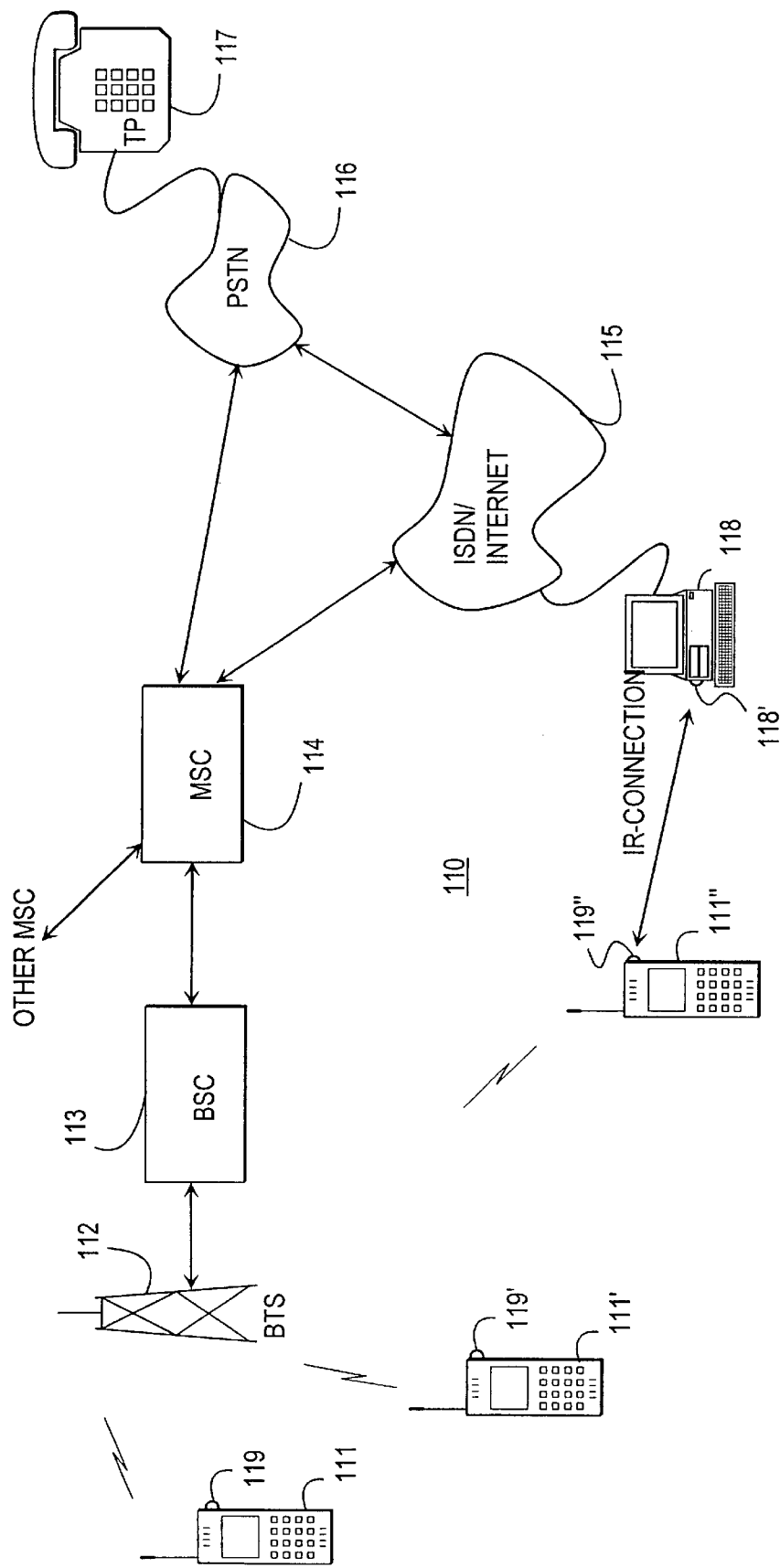
FIG. 9 presents a data transfer system according to the invention comprising e.g. mobile stations according to the invention.

An infrared link according to the invention is suitable for use e.g. in systems such as data transfer systems 110 presented in FIG. 9, in which systems there is a need for two-way data transfer, such as data transfer between mobile station 111, 111', 111" and portable computer 118. As receiver- and transmitter elements 118', 119, 119', 119" it is possible to use e.g. transmitter/receiver elements TX1, TX2, RX1, and RX2 presented in connection with FIGS. 3A, 3B, 3C, 4, 5 and 7. An exemplary embodiment of data transfer system 110 according to the invention comprises mobile stations 111, 111', 111", base station 112 (BTS, Base Transceiver Station), base station controller 113 (BSC, Base Station Controller), mobile switching center 114 (MSC, Mobile Switching Center), telecommunication networks 115 and 116, and user terminals 117 connected to the networks either directly or over a terminal device. In data transfer systems 110 according to the invention mobile stations 111, 111', 111" and other and user terminals 117 are connected to each other through telecommunication networks 115 and 116. It is also possible to transfer data utilizing the infrared link according to the invention between mobile stations 111, 111', 111" according to the invention.

The above is a description of the realization and its embodiments utilizing examples. It is self evident to persons skilled in the art that the invention is not limited to the details of the above presented axamples and that the invention can be realized also in other embodiments without deviating from the characteristics of the invention. The presented embodiments should be regarded as illustrating but not limiting. This the possibilities to realize and use the invention are limited only by the enclosed claims. The different embodiments of the invetion specified by the claims, also equivalent embodiments, are included in the scope of the invention.

What is claimed is:

1. A data transfer system, comprising:
a first terminal device including first means for transmitting first information using infrared light, and a second terminal device including means for receiving said first information transferred on said infrared light,
wherein said first terminal device further comprises second means for transmitting second information using infrared light, the second terminal device comprising additionally second means for receiving said second information transferred on said infrared light, said infrared light in transmission and reception being of the same wavelength range, and said terminal devices comprise, polarizers for separating from each other, based upon polarizations, said infrared light used for transmitting said first information with a first polarization and said infrared light used for transmitting said second information, with a second polarization, wherein said first information and said second information are a part of a total information, said total information being divided into the first information and the second information, and the first and the second information being simultaneously transmitted in order to in increase the data transfer rate of the total information.

2. The data transfer system of claim 1 wherein said first information and said second information are transmitted in the same direction from said first terminal device to said second terminal device.

3. The data transfer system of claim 2 wherein said first information and said second information are transmitted simultaneously.

4. The data transfer system of claim 1, wherein the data transfer rate is doubled.

5. A terminal device comprising first means for transmitting first information using infrared light and second means for transmitting second information using infrared light, further comprising polarizing means for transmitting said first information on infrared light having a first polarization and polarizing means for transmitting said second information on infrared light having a second polarization, wherein the angle between the polarization axis of said infrared light having the first polarization and the polarization axis of said infrared light having a second polarization is essentially 90°, and wherein said first information and said second information are a part of a total information, said total information being divided into the first information and the second information in order to increase the data transfer rate of the total information, and wherein said first information and said second information are simultaneously transmitted.

6. The terminal device of claim 5 wherein said first information and said second information are transmitted in the same direction from said first terminal device.

7. The terminal device of claim 6 wherein said first information and said second information are transmitted simultaneously.

8. The terminal device as claimed in claim 5, wherein the data transfer rate is doubled.

9. A method for transferring information from a first terminal to a second terminal device using infrared light, wherein the infrared light used for transferring said information is linearly polarized prior to transmitting to a transfer path, and wherein in the second terminal device the infrared light is directed at polarizing means prior to detection, wherein forming said linearly polarized light comprises dividing the information into first information and second information, the first information having a first polarization along a first polarization axis and the second information having a second polarization along a second polarization axis, wherein the angle between said first polarization axis and said second polarization axis is essentially 90°, and wherein first information and said second information are a part of total information, said total information being divided into the first information and the second information in order to increase the data transfer rate of the total information, and wherein said first information and said second information are simultaneously transmitted.

10. The method of claim 9 wherein said first information and said second information are transmitted in the same direction from said first terminal device to said second terminal device.

11. The method of claim 9 wherein said first information and said second information are transmitted simultaneously.

12. The method as claimed in claim 9, wherein the data transfer rate is doubled.

13. A terminal device comprising first means for receiving first information using infrared light, and a second means for receiving second information using infrared light, further comprising polarizing means for receiving said first information on infrared light having a first polarization and polarizing means for receiving said second information on infrared light having a second polarization, wherein the angle between the polarization axis of said infrared light having the first polarization and the polarization axis of said infrared light having a second polarization is essentially 90°, and wherein said first information and said second information are a part of a total information, said total information being divided into the first information and the second information in order to increase the data transfer rate of the total information, and wherein said first information and said second information are simultaneously transmitted.

14. The terminal device of claim 13 wherein said first information and said second information are transmitted in the same direction from said first terminal device.

15. The terminal device of claim 14 wherein said first information and said second information are transmitted simultaneously.

16. The terminal device as claimed in claim 13, wherein the data transfer rate is doubled.

* * * * *